3,394,019
REFRACTORY AND PROCESS FOR
MAKING THE SAME
Fritz Klasse, Winkel, Rheingau, Germany, assignor of sixty percent to Max H. Hoepli, New York, N.Y.
No Drawing. Filed May 18, 1964, Ser. No. 368,423
2 Claims. (Cl. 106—57)

This invention relates to a new refractory and more particularly to a process for making the same, this refractory being particularly adapted for use in contact with molten glass as are glass tank blocks, glass pots and the like.

One object is to provide in a commercially practicable manner a refractory having improved ability to withstand corrosive melts, particularly molten glass, and which is substantially or completely colorless so that it does not impart color to any substantial degree to molten glass with which it contacts.

This new refractory is made from a mixture of at least two clay compounds that differ from each other respecting their behavior when milled or ground, these compounds being milled together with supplementary small quantities of titanium oxide and zirconium silicate while suspended in an acidic wet medium. This wet milling produces a suspension or slurry or sludge that is chiefly or mainly colloidal, this suspension then being coagulated or stiffened by an addition of small quantities of spinel-forming oxides so it can be formed into small pieces which are fired or sintered. If solid shapes of relatively large dimensions are desired, such as glass tank blocks or glass pots, the sintered product is reduced to smaller particles which are mixed with the suspension from the milling just described but formed in this instance to function as a binding medium. The resulting mixture of the sinter particles and binding medium may then be shaped by any of the usual processes into the desired shapes which are then fired.

More specifically, the clay compounds may comprise the following:

(1) Alumina hydrates in an amorphous or crystalline state, such as diaspore and Boehmite [AlO(OH)], in particular hydrargillite or bayerite [Al(OH)$_3$], because these convert more easily when they are fired.

(2) Calcined aluminas, such as are obtained through heating any of the above hydrates to a glowing or incandescent condition.

By weight, from 15%–30%, and preferably from 20%–25% of the alumina hydrates are mixed with from 70%–85%, and preferably 75%–80%, of the calcined alumina. These weight percentages are relative to the dry substances.

To the above, from .2%–4% and preferably from .5%–1.5% of titanium oxide is added.

Zirconium silicate is added in quantities of from 1%–8%, preferably from 2%–5%.

Additions of 1% titanium oxide and 4% zirconium silicate are considered to be particularly preferable.

The above additions are made so that by adjusting the exact amounts of the two clays a 100% value by weight is obtained.

The mixture of the two clays, the titanium oxide and the zirconium silicate are ground in an acid aqueous medium until reduced to a substantially colloidal condition. A particle size of less than 40 microns should be obtained. In a wet-grinding drum-type mill, from 4–6 hours is ordinarily sufficient to provide this particle size, although individual grinding mills may require variations in the milling time.

The water added to the mixture for the milling should be sufficient to provide a viscous sludge or slurry having the viscosity that would ordinarily be considered proper for efficient grinding or milling in a drum-type mill. 47% of water by weight added to the dry unfired mixture is ordinarily sufficient.

The pH value of the water should be adjusted to from 4–6. One way to do this is by the addition of hydrochloric acid to the water.

When the mixture is milled to the described degree of fineness, it is then coagulated or stiffened by adding small quantities of oxide that with Al$_2$O$_3$ forms spinel. For example, BaO may be added. However, zinc oxide is particularly suitable and it may be used in quantities of from .5%–2% by weight.

The resulting coagulated or stiffened mass thus obtained is then fired at temperatures preferably not lower than 1500° C., and desirably at about 1600° C. With the latter firing temperature, a firing time of about four hours is usually sufficient to produce a dense sinter having a total porosity of less than 12%.

If desired, the mixture of clays to be milled may have added one of the so-called water-soluble clays or alumina gels, such as one containing 1Cl6Al. Such compounds are acid and make it unnecessary to otherwise acidify the water in order to obtain the pH value of from 4–6.

Preferably the coagulated or stiffened plastic mass obtained from the milling is formed into small lumps or particles to assure good sintering during the firing. The plastic mass can be granulated and then pressed into small shapes under high pressures and these shapes can be fired or sintered as described. The compression pressure should not be less than 300 kg./sq. cm., and should preferably be in the neighborhood of 500 kg./sq. cm. when forming these small pieces.

To form larger shapes, the sinter resulting from the foregoing firing can be granulated or reduced to a relatively small particle size which, however, need not approach the colloidal size to which the clay mixture is reduced by the milling. As a binder for these particles, the slurry or sludge obtained from milling the mixture of the two clays with the titanium oxide and zirconium silicate, can be used. This is not coagulated or stiffened in this instance, and is formed for the purpose of providing a binding agent. It is used in the form of a relatively free-flowing sludge or slurry and is mixed with small particles of the fired or sintered product. This binding medium may have mixed with it organic or inorganic adhesives or plastifying agents for the purpose of increasing its binding ability.

If the desired shape is to be obtained by the casting process, the slurry addition to the fired or sintered product is made relatively large as required to produce good castability. Shortly before being cast, it may be supplemented by the spinel-forming oxides used in small quantity, such as up to 2% and preferably in the neighborhood of 1%. This permits the casting to be unmolded more quickly.

The particle size to which the fired sinter is reduced is preferably less than 6 mm. and more desirably 4 mm. This provides greater density in the resulting products, combined with a good ability to withstand quick temperature changes.

If the desired shapes are to be stamped, jolt-rammed or pressed, it is generally sufficient to add from 10%–12% of the slurry or sludge obtained from the milling prior to its coagulation or thickening, this being relative to the weight of the sinter prior to the ultimate firing. The shapes obtained, which may be in the nature of glass tank blocks, glass pots and the like, are fired at temperatures higher than 1500° C. and preferably 1600°–1650° C.

For certain special applications, advantages may be gained by replacing a portion of the granulated sinter, not exceeding 50% by weight, and in particular any portion having a fine grain of less than .1 mm., by zirconium silicate of the same grain size. Such replacement of up to 10% is in general sufficient.

The following provides a specific example of the foregoing:

75 parts by weight of calcined alumina and 25 parts by weight of alumina hydrate are mixed with 5 parts by weight of water-soluble alumina (all weights relatively to the fired dry substance), 1 part by weight of titanium oxide and 4 parts by weight of zirconium silicate, water being stirred in to produce a viscous pourable sludge, which is then ground for 6 hours in a drum-type mill. The grain-size of the mixture is, for 90% of the grains, less than 40 microns. The sludge obtained is stiffened by adding 2 parts of zinc oxide, the plastic mass is then dried, reduced to small pieces, as by being granulated, and is then pressed by a pressure of 500 kg./sq. cm. into small briquettes having a maximum dimension of 3 to 4 cm. The firing of these small briquettes is done at 1600° C. and the briquetes are subjected to this temperature for 6 hours.

The sinter obtained has the following characteristics:

| | |
|---|---|
| Apparent porosity | 3.5%. |
| Total porosity | 9.8%. |
| Color | White to yellowish-white. |

Standard test specimens made from the sinter gave the following:

KDF more than 2000 kg./sq. cm.
TWB higher than 1800° C.

The characteristics of the sinter, particularly its porosity, can be altered by varying the grinding time, the compressing pressure and the firing temperature within certain limits, to obtain, for example, 5%–12% porosity.

To form the larger shapes, 50 parts by weight of the clay sinter according to the above and having a grain size from 0.5 to 4 mm., and 50 parts by weight of the clay sinter according to the above and having a grain size from 0 to 0.5 mm., have mixed with them 10 parts by weight of the clay slurry described by the foregoing, and 2 parts by weight of a 5% methyl cellulose solution, and there are stamped from this mixture in the usual way tank blocks for glass-melting furnaces dimensioned 500 x 400 x 300 mm., which are fired at 1650° C., the blocks being kept at this temperature for two hours.

The characteristics of these blocks are:

| | |
|---|---|
| Alumina content | 95%. |
| Volumetric weight | 3.41 gr./cubic cm. |
| Specific weight | 3.93 gr./cubic cm. |
| Total porosity | 13% by volume. |
| Apparent porosity | 10% by volume. |
| KDF | Over 2000 kg./sq. cm. |
| DFB | Over 1800° C. |
| Heat expansion, up to 1000° C. | 0.8% linear. |

These blocks were installed in the wall facing the flow of molten glass of a green-glass melting furnace, together with prior art moleten-cast refractory blocks known to be very resistant to corrosion. At the end of the operations of the furnace, the blocks of the invention projected 15 mm. farther out of the wall.

As previously indicated, it is also possible to substitute zirconium silicate having a fine grain size of less than .5 mm., and in particular less than .1 mm., for the finer grained portion of the clay sinter described above in connection with the making of the tank blocks or the like.

Tests have shown that glass tank blocks made according to the foregoing are more resistant to molten glass than the prior art molten-cast blocks. The porosity of the blocks of the present invention can be decreased even further by appropriate choice of grain size as to the clay sinter used, this being the sinter as described before. The new tank blocks are completely or substantially colorless and do not impart any color to the glass.

What is claimed is:

1. A process for making a refractory suitable for contact with molten glass, said process comprising milling together about 70% to about 85% by weight of calcined alumina, about 15% to about 30% by weight of alumina hydrate, about 0.2% to about 4% by weight of titanium dioxide, and about 1% to about 8% by weight of zirconium silicate in an acidic liquid to form a substantially colloidal suspension, coagulating this suspension by adding a small but effective amount of a spinel-forming oxide thereto and sintering the coagulated suspension.

2. The process of claim 1 in which said spinel-forming oxide is selected from the group consisting of zinc oxide and barium oxide.

References Cited

UNITED STATES PATENTS

| | | | |
|---|---|---|---|
| 2,633,622 | 4/1953 | Robinson | 106—57 |
| 2,842,447 | 7/1958 | Schlotzhauer et al. | 106—57 |

TOBIAS E. LEVOW, *Primary Examiner.*

J. E. POER, *Assistant Examiner.*